United States Patent

Schlanger

[15] 3,695,629
[45] Oct. 3, 1972

[54] SAFETY VEHICLE FOR PASSENGERS

[72] Inventor: Samuel L. Schlanger, 110-11 Queens Blvd., Forest Hills, N.Y. 11375

[22] Filed: Sept. 28, 1970

[21] Appl. No.: 75,984

[52] U.S. Cl. ........280/150 AB, 280/150 B, 296/35 R, 296/65 A, 296/84 K, 180/91
[51] Int. Cl. .............................................B60r 21/06
[58] Field of Search ...280/150 AB, 150 B; 296/84 K, 296/24, 35 R, 65 A; 244/121, 122; 180/91; 180/91

[56] References Cited

UNITED STATES PATENTS

| | | | |
|---|---|---|---|
| 2,806,737 | 9/1957 | Maxwell | 280/150 |
| 3,011,823 | 12/1961 | Maher | 280/150 |
| 3,037,809 | 6/1962 | Praha | 296/84 |
| 3,133,746 | 5/1964 | Zazzara | 280/150 |
| 3,162,479 | 12/1964 | Hewitt | 296/35 |
| 3,423,121 | 1/1969 | Lipkin | 280/150 |
| 3,443,824 | 5/1969 | Dietrich | 296/65 |
| 3,494,633 | 2/1970 | Malloy | 280/150 |
| 3,508,783 | 4/1970 | Schlanger | 296/35 |

*Primary Examiner*—Kenneth H. Betts
*Attorney*—Allison C. Collard

[57] ABSTRACT

A safety vehicle for passengers having a movable passenger compartment which includes life-saving nets or cushions which become disposed in front of the passengers when the passenger compartment detaches itself from the vehicle and assumes its inclined position. The invention also includes release means connected to the front and rear bumpers for actively releasing the passenger compartment upon collision or impact as well as releasing the controls and steering wheel of the vehicle. A rack and pinion combination are also provided for connecting the passenger compartment to the vehicle to assure a parallel detachment of the compartment during a collision.

11 Claims, 15 Drawing Figures

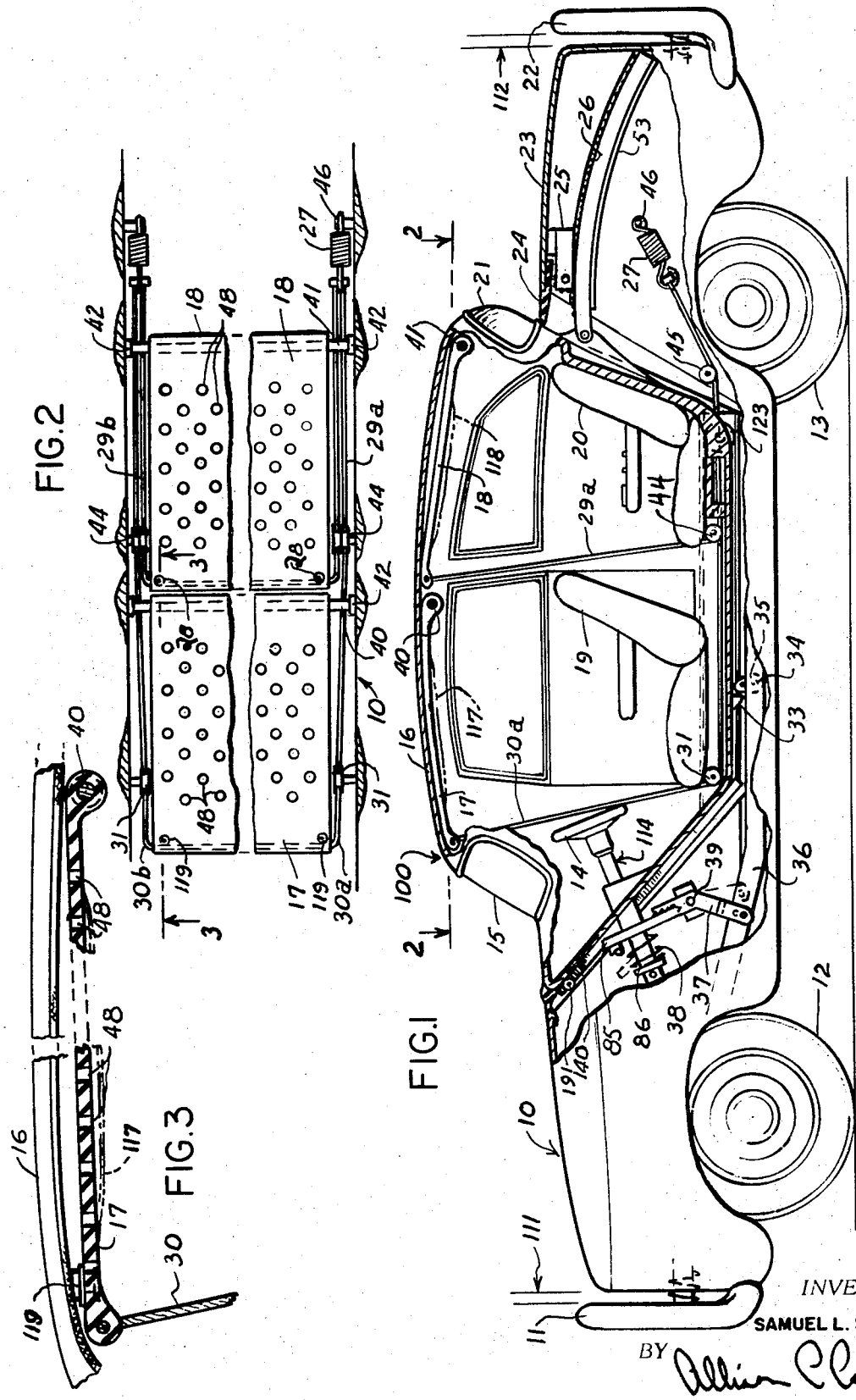

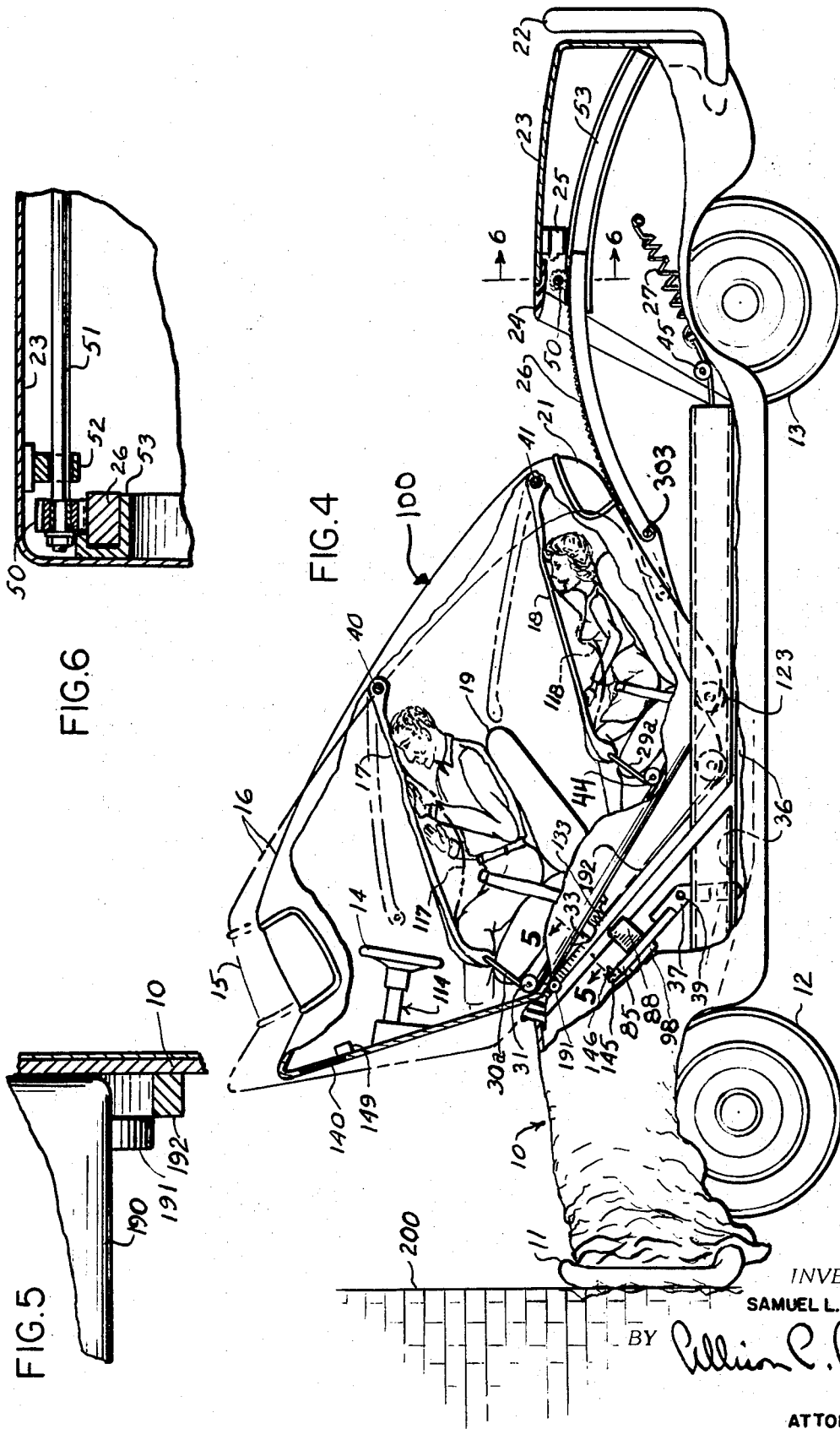

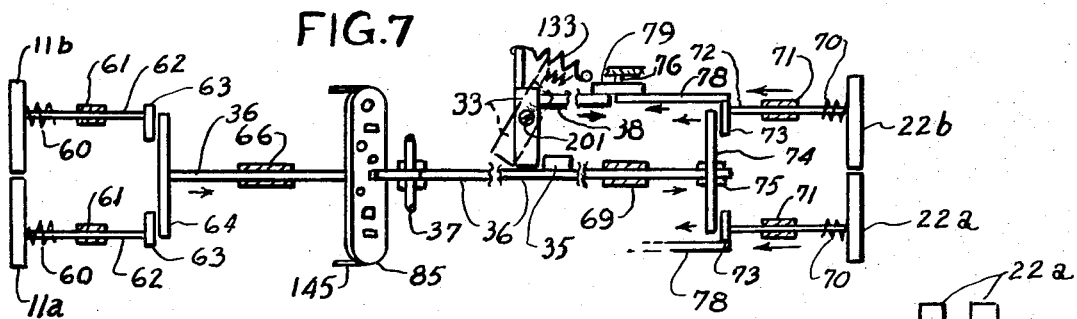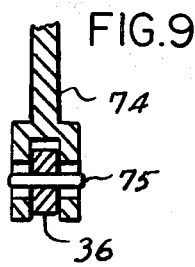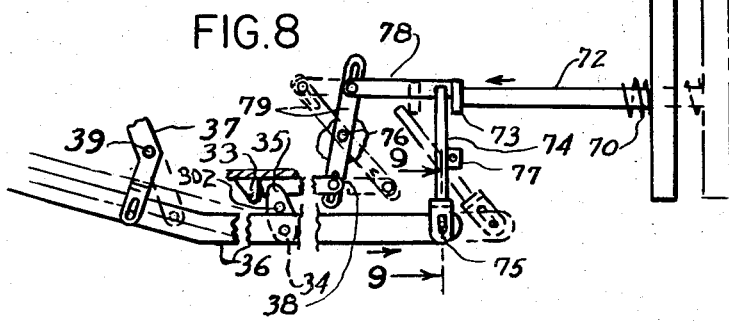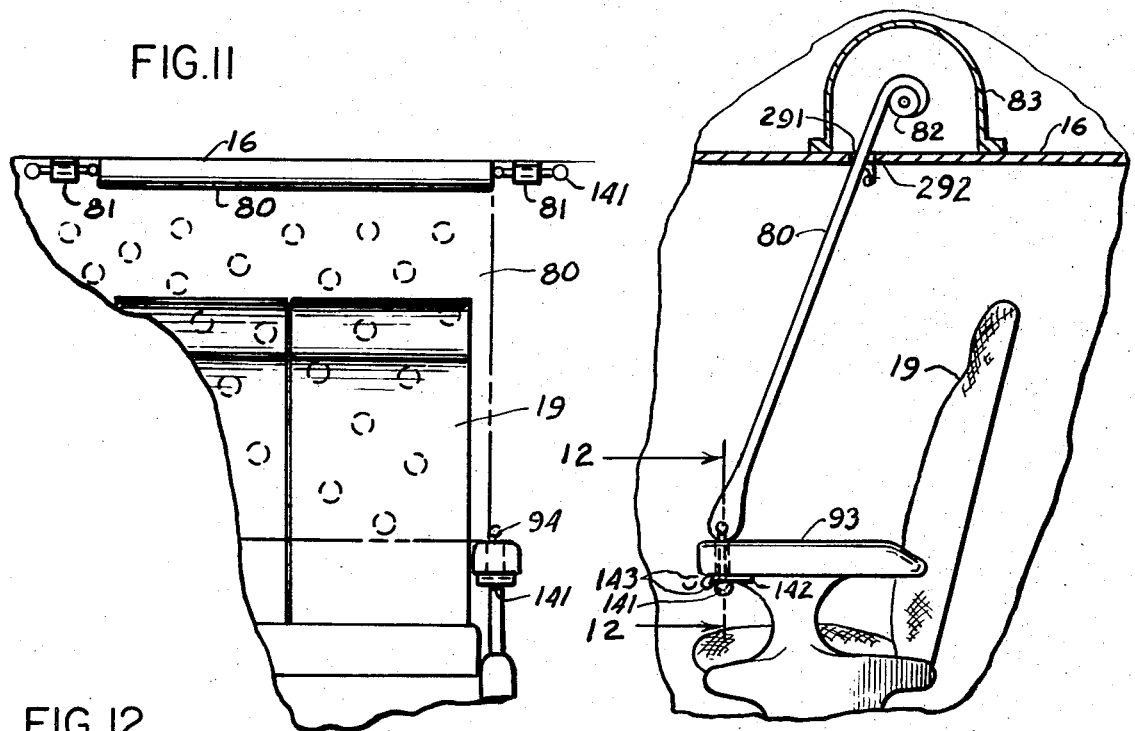

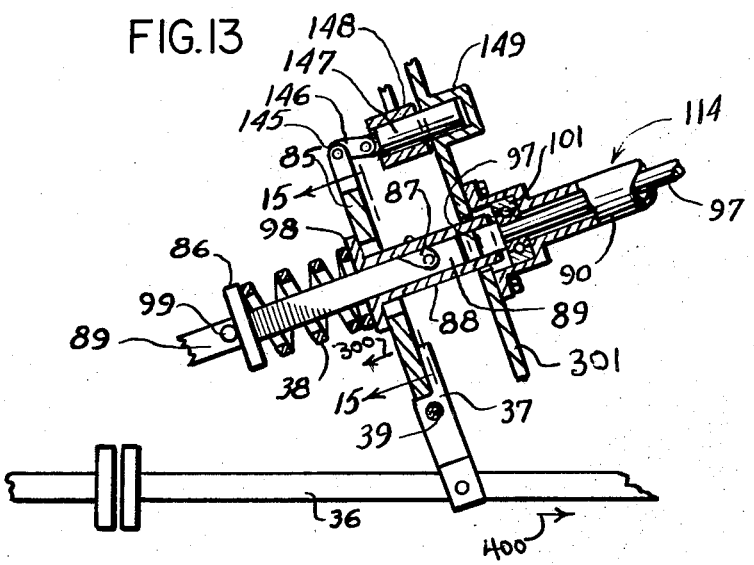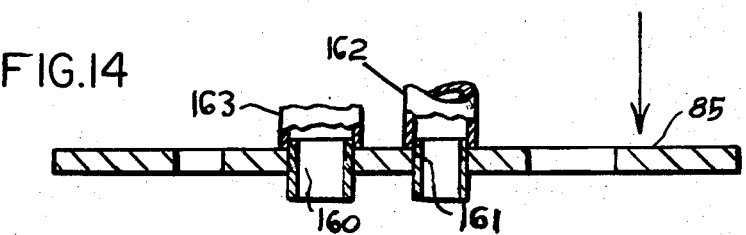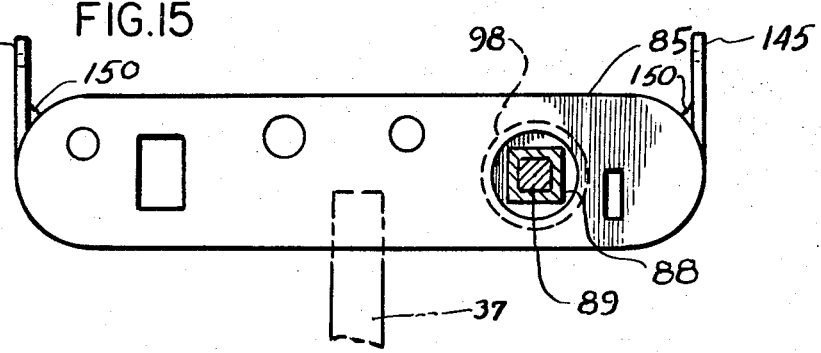

SAFETY VEHICLE FOR PASSENGERS

This invention relates to improvements in vehicles which provide a greater safety factor than in conventional automobiles for head-on and whiplash collisions and the like.

The use of a safety belt or harness has to a great extent prevented passengers in a moving vehicle from being forcibly thrown through the vehicle's windshield during a collision with a fixed or moving object. In many of these collisions, there is a sharp impact due to the sudden deceleration of the vehicle and its occupants. In several conventional devices, efforts have been made to cushion the blow by providing a retractable front bumper which trips the seat rearwardly in an almost vertical position upon impact, so that the seat acts as a barrier to the forward travel of the rider.

In another type of a conventional vehicle, the passenger compartment is mounted in a cradle on tracks which are adapted to release the passenger compartment at high speed impacts, allowing the passenger compartment to travel in the direction of movement in the vehicle to reduce the deceleration forces upon the passenger.

In another conventional safety vehicle, an inflatable cushion is provided in front of each passenger which is designed to automatically inflate upon the high speed impact of the vehicle so as to reduce the possibilities of a second collision by passengers with the structure of the vehicle.

The present invention is an improvement over all of the above-described conventional devices in providing a passenger compartment which not only becomes detached from the vehicle upon impact, but also cushions the passengers during a second collision following impact. The cushions are preferably pivotably mounted in the ceiling of the detachable compartment so that after impact the cushions are automatically disposed in front of the passengers as the compartment moves forward and upward. Further improvements also permit the controls in the passenger compartment to automatically detach from the vehicle.

It is, therefore, an object according to the present invention to provide an improved safety vehicle having a detachable passenger compartment with a passenger cushioning means.

It is another object according to the present invention to provide an improved safety vehicle having a detachable passenger compartment which is automatically displaced upon impact of the vehicle.

It is still a further object according to the present invention to provide an improved safety vehicle which is simple in design, economical in production and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views:

FIG. 1 is a plan view, partly in cross section of the vehicle according to the present invention;

FIG. 2 is a cross-sectional view taken along section 2—2 of FIG. 1;

FIG. 3 is a detailed view of the top of the vehicle including cushioning means taken from FIG. 1;

FIG. 4 is a plan view partly in cross-section of the safety vehicle after impact;

FIG. 5 is a cross-sectional view taken along section 5—5 of FIG. 4;

FIG. 6 is a cross-sectional view taken along section 6—6 of FIG. 4;

FIG. 7 is a plan view, partly in schematic form, of the bumper actuator release mechanism of the safety vehicle;

FIG. 8 is a side plan view in detail of the release mechanism of FIG. 7;

FIG. 9 is a cross-sectional view taken along section 9—9 of FIG. 8;

FIG. 10 discloses another type of cushioning means for mounting in front of the passengers;

FIG. 11 is a front plan view of the embodiment of FIG. 10;

FIG. 12 is a cross-sectional view taken along section 12—12 of FIG. 10;

FIG. 13 is a detail plan view, partly in cross-section, of the releasable steering mechanism of the invention; and FIG. 14 is a detailed view of the ventilation connections which are quickly detachable from the passenger compartment; and FIG. 15 is a view taken along line 15—15 of FIG. 13.

Referring to FIGS. 1–3, there is shown a safety vehicle 10 having a front bumper 11, rear bumper 22, and a pair of front wheels 12 and rear wheels 13. Both bumpers 11 and 22 are separated from the body of the vehicle by spaces 111 and 112. The passenger compartment 100 of the vehicle includes a roof 16, a windshield 15 and rear window 21. Pivotably disposed within the ceiling of the passenger compartment are safety nets or cushions 17 and 18. The rear edge of cushion 17 is pivoted on axle 40, and the rear edge of cushion 18 is similarly pivoted on axle 41. Both axles 40 and 41 are trunnioned in bearings 42 which are mounted on the vertical walls of compartment 100. The front edge of cushion 17 is connected to a pair of parallel cables 30a and 30b which extend downwardly along the sidewalls of vehicle 10 around pulleys 31, intermediate pulleys 44 and rear pulleys 45 for connection to springs 27. The front edge of cushion 18 is likewise connected to cables 29a and 29b which are guided around dual pulleys 44 and 45 for connection to spring 27. The back end of springs 27 are mounted to studs 46 which are secured to the sidewalls of vehicle 10. A space is provided between the rear end of passenger compartment 100 and the front end of the trunk compartment, for preventing the whiplash of the passengers. This space is covered by a flexible gasket 24.

Cushions 17 and 18 are preferably constructed from a resilient shock-absorbing material, such as latex, and include perforations 48 disposed over their surfaces to permit the passengers to breathe when the cushions are in place. The cushions may also be inflatable-type bags 117 and 118, as shown in broken line, which rapidly inflate when the passenger compartment moves upward. A transparent viewing plate 140 permits the driver in the compartment to view the instruments of the vehicle mounted within the vehicle body. The driver and passengers, who are in the movable compartment, ride up into the cushions before the second collision occurs. Catches 28 and 119 frictionally engage the cushions or bags to roof 16 to retain the bags or cushions during normal riding conditions.

Referring to FIGS. 4-6, there is shown the embodiment of FIG. 1 following a collision of the vehicle with a wall 200. The bottom portion 190 of passenger compartment 100, as shown in detail in FIG. 5, includes a wheel 191, and a wheel 123, mounted on each side and adapted to ride along a corresponding rail 192 secured along chassis 10 of the vehicle. Passenger compartment 100 rides up on wheel 191 and rail 192 on each side of the vehicle chassis to its position shown in FIG. 4, so that steering wheel 14 and its associated controls become released from panel 85 connected to lever 37. Lever 37 is connected to control lever 36 which is responsive to the impact of the vehicle from either direction. In FIGS. 4 and 6, there is also shown a pair of parallel, movable racks 26, slidably disposed in corresponding channels 53 which are mounted on each side of the trunk compartment of the vehicle. Pinion gears 50 are mounted on each end of connecting shaft 51, and engage racks 26. Bearings 52, mounted adjacent to the ends of the shaft 51, pivotably support shaft 52. Bearings 52 are mounted to surface 23 in the trunk compartment. Block 25 supports channel 53 to trunk surface 23. The end of each rack 26 is connected by means of pin 303 to the rear end of passenger compartment 100 to allow the passenger compartment to travel forward and upward in a parallel manner. The broken-line portion of FIG. 4 indicates the full extent of travel of passenger compartment 100.

As shown in detail in FIGS. 7, 8, and 9, front bumper 11 is divided into two portions 11a and 11b, which are connected through shafts 62 to hammers 63. Bearings 61 guide shafts 62 for impact against hammer plate 64. Springs 60 pretension bumper portions 11a and 11b so that the bumpers are initially spring-loaded for minor impact. When hammers 63 impact against plate 64, lever 36, connected on one end of plate 64, is pushed rearward through bearing 66. The movement of lever 36 causes lever 37 to release control plate 85 as described with reference to FIG. 13. The bottom of the passenger compartment includes a block 33 for engagement against arm 35 which is pinned by pin 34 on lever 36, and pivoted at axis 302. At impact, the movement of lever 36 causes arm 35 to engage blocks 33, on both sides of the passenger compartment, to move the compartment forward and upward.

Rear bumper 22 is divided into two portions 22a and 22b which, in a manner similar to the front bumpers, include tension springs 70 and bearings 71 to springload the bumpers against minor impact. Each bumper portion 22a and 22b is connected through levers 72 to hammers 73 which are capable of impacting against hammer plate 74. Hammer plate 74 is connected to the other end of lever 36 so that lever 36 is capable of sliding through bearings 66 and 69 to also effect the release of control lever 37. As shown in detail in FIG. 8, hammer plate 74 is a vertical plate pivotably mounted along its center portion on pivot 77 and connected at the opposite end to lever 36 by means of pin 75. Thus, lever 36 will also be pushed rearward upon impact of bumpers 22 disconnecting all control. Link 79 connects link 78 to link 38, pivoted at axis 76. Link 38 exerts pressure against springloaded block 33 pivoted at axis 201. At rear impact hammer 73, link 78 moves in the direction of the arrow shown, upon high impact of the rear bumper. This pulls link 38 in an opposite direction through pivoted link 79 away from block 33, and allows spring 133 to swing block 33 clear of arm 35.

FIGS. 10, 11, and 12 show another embodiment of the invention, wherein a safety net 80, which may be used in place of safety net 17, is coiled on a springloaded roller 82 mounted on roof 16 of the vehicle. Net 80 is particularly useful for aircraft. When a collision is about to occur, safety net 80 is manually pulled through opening 291 past cover 292 for connection to arm rest 93 of seat 19. Roller 82 is pivotably mounted by means of bearings 81 to the roof of the vehicle and may be recessed in a housing 83 as shown in detail in FIG. 10. On each side of the lower end of net 80 is connected a bolt 94. The ends of bolts 94 are enlarged by means of balls 141, which are adapted to pass through cylindrical openings near the ends of the arm rests. On the bottom surface of each arm rest 93, there is secured a channel 142 for slidably receiving a catch 143. Catch 143 includes a V-shaped notch or opening so that when it is fully inserted in channel 142, it engages and locks against shaft 94 to prevent ball 141 and the shaft from being removed from arm rest 93. The bottom end of safety net 80 connects by means of bolts 94 to arm rest 93.

Referring to FIG. 13, there is shown a detailed view of the connection of steering column 114 to the release mechanism connected to lever 36. Steering wheel 14 is connected through shaft 97 to a telescoping square collar 88. The end of shaft 97 preferably includes a square surface which is mechanically coupled to a corresponding sliding surface in tubular collar 88. Likewise, square shaft 89 is also mechanically engaged to telescoping square collar 88 and includes a compression spring 38 mounted between flanges 86 and 98 to urge collar 88 toward the front of the vehicle away from steering shaft 97. A ratchet catch 87, engaged through an opening in collar 88, and locks collar 88 by the action of spring 38. Flange 86 is restrained on shaft 89 by means of pin 99. As a collision occurs, lever 36 moves in the direction of arrow 400, causing arm 37 to pivot on axis 39 so as to move panel 85 in the direction of arrow 300. As the panel 85 moves, it compresses spring 38, and moves square collar 88 and latch 147 in the direction of arrow 300. Collar 88 thus becomes disconnected from steering shaft 97. Latch 147 also becomes disengaged from socket 149 on firewall 301 of the passenger compartment. Latch 147 is pivotably connected to lever 146, which is pivoted to lever 145. Lever 145 is welded in two places to panel 85. As firewall 301 becomes disconnected from panel 85, ratchet 87 holds collar 88 in its disengaged position to permit forward and upward travel of the passenger compartment.

Referring to FIGS. 14 and 15, there is shown a detailed view of control panel 85 having ventilating connections 160 and 161 detachably connected to outlets 163 and 162. When a collision occurs, connections 160 and 161 will be pulled away from outlets 163 and 162 since panel 85 moves away from outlets 163 and 162.

While only a few embodiments of the present invention have been shown and described, it will be understood that many changes and modifications may be made thereunto without departing from the spirit and scope of the invention.

What is claimed is:

1. A safety vehicle for passengers comprising;
   a vehicle body,
   a passenger compartment for detachable movement on said vehicle body, said compartment including passenger seats and vehicle controls,
   safety net means pivotably disposed on the ceiling of said passenger compartment,
   means for pivotably mounting one edge of said safety net means above each of the passenger seats, and
   cable means for joining the other end of said safety net means to the body of the vehicle so that during a collision of the vehicle, said safety net means becomes pivotably disposed in front of the passengers and restrained in place by said cable means as said passenger compartment moves forward and upward.

2. The vehicle as recited in claim 1, wherein said safety net means comprises at least one cushion for disposal in front of the passenger, said cushion including a plurality of apertures.

3. The vehicle as recited in claim 1, wherein said safety net means comprises inflatable cushions.

4. The vehicle as recited in claim 1 additionally comprising a collision lever disposed along the longitudinal dimension of the vehicle and coupled to the rear and front bumpers, a control panel mounted in the compartment and release means coupled to said collision lever and said control panel for releasing said control panel of said passenger compartment from the body of said vehicle upon collision of the vehicle.

5. The vehicle as recited in claim 4, wherein said release means comprises an arm pivotably coupled to said collision lever, and engaged to said control panel, a collar mounted on said control panel for coupling the compartment steering shaft to the vehicle steering shaft, a spring coupled to the vehicle steering shaft for maintaining said collar in an engaged position, a ratchet coupled to said collar so that upon impact of the vehicle, said arm urges said collar against said spring to disengage the vehicle steering shaft from the compartment steering shaft to permit forward and upward travel of the passenger compartment.

6. The vehicle as recited in claim 4 additionally comprising a front hammer plate connected to the front end of said collision lever, a vertical lever connected to the rear end of said collision lever, a rear hammer plate coupled to the other end of said vertical lever, a first pair of spring-loaded hammer rods coupled to said front bumpers for engagement with said front hammer plate, and a second pair of spring-loaded hammer rods coupled to said rear bumpers for engagement with said rear hammer plates.

7. The vehicle as recited in claim 4 additionally comprising an impact arm coupled to said collision lever, and a block mounted in said passenger compartment for engagement to said impact arm so that the movement of said collision lever will urge said passenger compartment upward and forward.

8. The vehicle as recited in claim 4 additionally comprising a separation between the rear of said passenger compartment from said vehicle body.

9. The vehicle as recited in claim 1, wherein said compartment comprises rail means mounted on the front portion of said compartment and wheel means pivotably mounted on the rear portion thereof, and wherein said vehicle body comprises track means disposed along its longitudinal dimension and coupled to said rail means and said wheel means so as to permit said compartment to be slidably movable along said track upon collision of the vehicle.

10. The vehicle as recited in claim 9, wherein said passenger compartment additionally comprises a pair of parallel spaced-apart racks having one end pivotably coupled to the rear of said compartment, a pair of pinion gears engaged to each of said racks, and a shaft joining said pinions and pivotably supported on said vehicle body.

11. The vehicle as recited in claim 1, wherein said cable means comprises at least one pair of parallel spaced-apart cables having one end connected to an edge of said safety net means, a pair of springs for connecting the other ends of said cables to said vehicle body, and a plurality of pulleys pivotably mounted along the bottom of said passenger compartment for slidably receiving and guiding said cable pair.

* * * * *